(No Model.)

T. GOTHORPE.
TELEGRAPHY.

No. 475,938. Patented May 31, 1892.

Witnesses
H. W. Elmore
M. M. Westafer

Thomas Gothorpe Inventor
By his Attorneys
Ennis & Goldsborough

UNITED STATES PATENT OFFICE.

THOMAS GOTHORPE, OF RYE, NEW HAMPSHIRE.

TELEGRAPHY.

SPECIFICATION forming part of Letters Patent No. 475,938, dated May 31, 1892.

Application filed August 15, 1889. Serial No. 320,896. (No model.)

*To all whom it may concern:*

Be it known that I, THOMAS GOTHORPE, a citizen of Great Britain, residing at Rye, in the county of Rockingham and State of New Hampshire, have invented certain new and useful Improvements in Telegraphy; and I do hereby declare the following to be a full, clear, and exact description of the invention, such as will enable others skilled in the art to which it appertains to make and use the same.

This invention relates to the class of apparatus employed for transmitting telegraphic messages either over a single main line or from one line to another.

The object of the invention is to provide a combination of transmitting apparatus, whereby a more equal variation of potential is produced at the distant end of a line by signals of unequal length and periodicity, or by currents of irregular alternation.

The invention is especially adapted to be employed in connection with submarine cables, where these variations of potential are very irregular.

The general principles upon which the invention is constructed consist of a battery or batteries controlled by a key and pole-changer and other transmitting devices, whereby signals of unequal length are transformed into and transmitted by means of currents of adjustable and uniform duration separated by unequal periods, during which weaker currents of the same or opposite polarity may pass to line or the line may be broken, earthed through an adjustable resistance, or earthed direct. The transmitter is controlled by the key and battery or by a pole-changer and battery through a local circuit and condenser, induction-coil, or other means for converting currents of unequal length into currents of uniform duration. The armatures of the transmitter are thus attracted at each movement of the key, but return to their normal position independently of the position or movement of the key.

Figure 1:
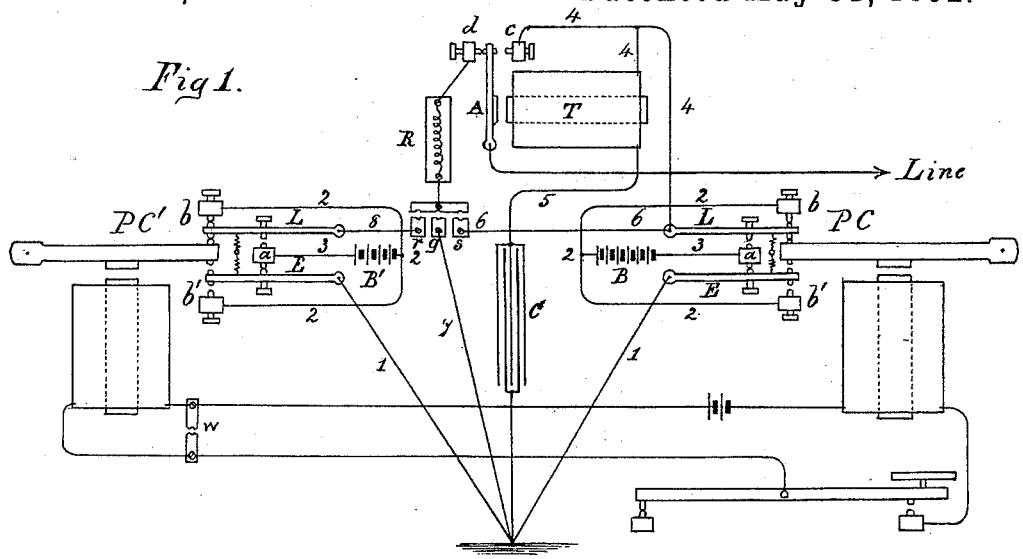
Figure 2:
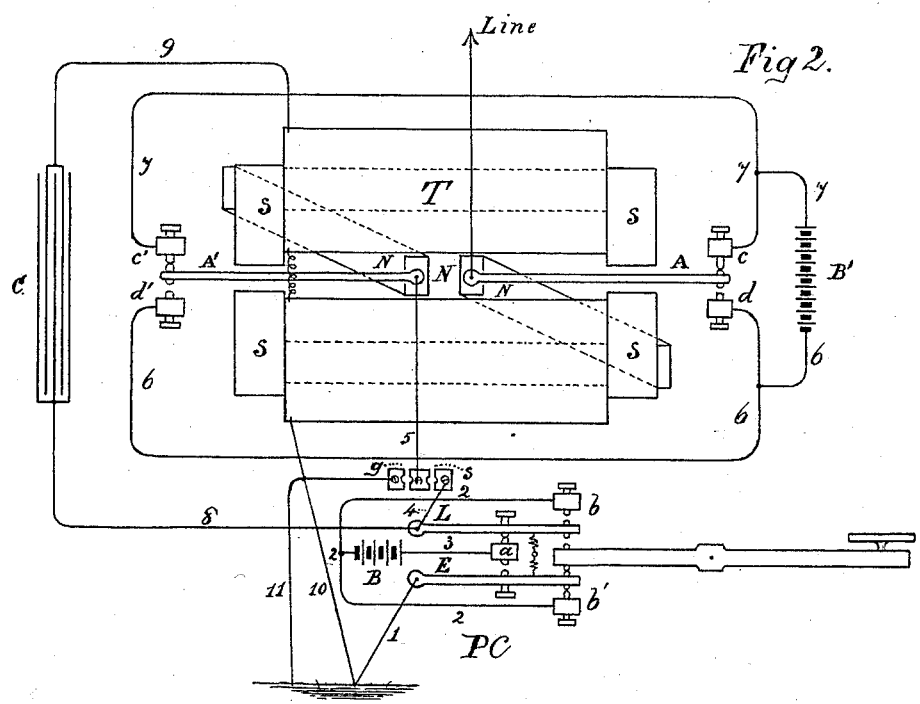

In the accompanying drawings, which illustrate my invention, Figure 1 is a view of my transmitter, showing the battery and circuit connection; and Fig. 2 shows a modified arrangement of parts in which a polar relay is used.

The reversing-key or pole-changer shown will preferably be used, and consists of two levers L and E, connected, respectively, to line and earth, and having a tendency by means of springs to make contact at the point $a$, which is connected to one pole of the battery. An actuating-lever is placed between them and holds one or the other from the stop $a$ and connects it with one of the stops $b$ or $b'$, which are connected to the other pole of the battery. The levers are adjusted so that L and E are momentarily connected together through the stop $a$ on each reversal of the key. Thus the line is earthed before each reversal of the battery.

The transmitter shown in Fig. 2 may consist of two polarized relays; but will preferably consist of a compound polarized relay, as shown. The soft-iron armatures A A' are pivoted near two like poles of the permanent magnets S N N S and insulated from each other. The other poles of the magnets have coils attached, which actuate the armatures A A'. When no current is passing through the coils, the armatures are usually adjusted to remain against $c$ and $c'$.

The operation of the instruments will be described in detail in connection with Figs. 1 and 2.

In Fig. 1 the pole-changers P C and P C' are worked by the key and local battery in the ordinary manner. The transmitter-magnet T is actuated by the battery B through a local circuit and condenser C, and the movement of its armature, which is connected to line, determines the length of time during which the currents pass from battery B direct to the line. When the key is first placed in the position shown, the negative current from the battery B is carried through a conductor 3 to the stop $a$, thence by the lever E and a conductor 1 to the earth. The positive current passes through conductor 2 to the stop $b$, thence to the lever L, and thence by conductor 4 to the coils of the magnet T. Thence by conductor 5 it passes to the condenser C, the opposite plates of which are connected to the earth. A short current thus traverses the coils of magnet T, and the armature A is momentarily attracted to stop $c$ by each movement of the key and pole-changer P C. The positive current from battery B thus also passes from lever L and conductor 4 to the stop $c$, and thence by the armature A to line. When A returns to its normal position, the line is connected by lever A to the stop $d$, which may be connected through the adjustable resistance R to any of the points $s$ $g$ $r$. If connected through $s$, the current from the battery B will pass from lever L and conductor 6 through $s$ and resistance R to the stop $d$, and armature A to line. Thus currents of equal duration are sent directly to line from battery B and are separated by intervals, during which weaker currents from the same battery are sent to line. If connection has been made at $g$, on the return of lever A to $d$ the line is earthed through armature A, stop $d$, resistance R, point $g$, and conductor 7 to earth. Thus the line is earthed through an adjustable resistance during the intervals between the currents. If connection has been made at $r$, on the return of lever A to $d$ the line is connected through lever A, stop $d$, resistance R, point $r$, and conductor 8 to the lever L of the pole-changer P C', which sends a current to line in the same manner, but usually of the opposite polarity to P C. Thus the currents passing to line from battery B are separated by intervals, during which currents from battery B' are sent to line. By the adjustment of the length and potential of the initial currents and of the potential and polarity of the compensating currents or of the resistance between line and earth a perfect adjustment can be obtained, so that the potential at the receiving end of the line may be the same at the end of a dot or a dash. A switch $w$ is shown, whereby pole-changer P C' may be cut out of the local circuit.

In Fig. 2 the transmitter T may be worked by a pole-changer or key from either a local or main battery through a condenser C. The movement of its armatures A A' determine the polarity and duration of the currents passing to line from battery B'. When the key or pole-changer P C is first placed in the position shown, the negative current from the battery B passes through conductor 2, stop $b'$, lever E, and conductor 1 to earth. The positive current flows through conductor 3, stop $a$, lever L, and conductor 8 to condenser C, the opposite plates of which are connected by conductor 9 to the coils of T, and thence through the coils and conductor 10 to earth. A short current thus traverses the coils of T, which is so wound that the armature A' is attracted momentarily to $d'$. If connection has been made at $s$, the current from battery B also passes from lever L by conductor 4, plug S, conductor 5, armature A', stop $d'$, and conductor 6 to battery B', thence with the additional force of that battery through conductor 7, stop $c$, and armature A to line. When the armature A' falls back to $c'$, the current from battery B flows through conductor 4, plug $s$, conductor 5, armature A', stop $c'$, conductor 7, stop $c$, and armature A to line. If connection has been made at $g$, the current from battery B' only passes to line by the operation of levers A or A'. When the armatures return to their normal positions, the line is connected by armature A, stop $c$, conductor 7, stop $c'$, armature A', conductor 5, plug $g$, and conductor 11 to earth. On reversing the key a similar series of effects takes place in the opposite direction, armature A being attracted to $d$ for an instant, by which a reverse current from battery B' or from batteries B' and B passes to line. Thus alternating currents are caused to pass to line separated in the intervals by weaker currents or by the line being earthed. By this form of transmitting apparatus currents of variable strength can be put to line at the will of the operator, and the line will be freed of tailings and be made clean for the reception of the succeeding signals by the automatic action of the transmitter after the initial current has been effective on the line.

By the use of the pole-changing apparatus in a condenser-circuit the complete operation after the depression of the key in the local circuit controlling the same is automatic, and by adjusting the contacts the amount of battery sent to line can be regulated, as well as its polarity and the time intervening between the impulses.

Having described my invention, what I claim is—

1. In a telegraphic transmitting device, a pole-changer in a condenser-circuit, battery and circuit connections being controlled by the pole-changer, so that a definite amount of current will be sent to line and the line immediately put into condition to discharge, substantially as described.

2. A telegraph-transmitter consisting of a pole-changer located in a local circuit having a key, battery, and condenser therein, the pole-changer controlling the battery connections for the main line, whereby the battery is put to line when the local condenser-circuit is closed, and the line-circuit is broken immediately afterward, substantially as described.

3. The combination of a local circuit containing a key, battery, condenser, and the coils of a transmitting-magnet, with the main-line circuit and battery controlled by such magnet, whereby the battery is momentarily put to line, substantially as described.

4. In a telegraphic transmitting device, a pole-changer, a battery and circuit connection controlled by such pole-changer, a condenser and a magnet controlling the line and ground contacts included in such circuit, the line and ground contacts being connected to allow a definite amount of current to pass to line, and the line put into condition to discharge, whereby the line is cleared after the signaling-current has been sent, substantially as described.

5. A telegraphic transmitting apparatus consisting of a pole-changer having an armature, battery, and local-circuit contacts in the path of such armature, a magnet and a condenser being included in the local circuit, such magnet controlling the connection of the line with one or more differently-conditioned ground-lines, whereby on movement of the armature the signaling-impulse is first sent over the line during a definite time, after which the current may be varied by connecting the line with either of the ground branches, as and for the purpose described.

6. In a telegraphic apparatus, a local circuit containing a battery and a key, a pole-changer controlled by such local circuit and arranged to control the battery of a main-line circuit, and a magnet located in a condenser-circuit, being first charged by such battery and controlling the main-line contacts, substantially as described.

7. A telegraphic transmitter consisting of permanent magnets having armatures pivoted to like poles thereof and presented to their opposite poles, coils surrounding such permanent magnets and located in a condenser-circuit, means for controlling such circuit, and battery and line connections controlled by the armatures of such permanent magnets, substantially as described.

8. A polarized transmitting device for telegraphy, consisting of a polar-magnet in a local condenser-circuit, a line-battery connected with opposite poles to the contacts of such relay, and means for grounding the line after the transmission of an impulse.

In testimony whereof I affix my signature in presence of two witnesses.

THOMAS GOTHORPE.

Witnesses:
CALVIN PAGE,
JAMES DOUGLAS.